US00RE46828E

(19) United States
(12) Reissued Patent
Spillane et al.

(10) Patent Number: US RE46,828 E
(45) Date of Reissued Patent: May 8, 2018

(54) VEHICLE CONTROL

(71) Applicant: Jaguar Land Rover Limited, Whitley, Coventry, Warwickshire (GB)

(72) Inventors: Anthony Francis Spillane, Worcestershire (GB); William Burdock, West Midlands (GB); David Andrew Clare, Oxfordshire (GB); Derek Leslie Jones, West Midlands (GB); John Anthony Kellett, Worcestershire (GB); Jan Pieter Prins, Solihull (GB); Keith Gary Reginald Parsons, Worcestershire (GB); Paul Malcolm Darnell, Warwickshire (GB)

(73) Assignee: Jaguar Land Rover Limited, Whitley, Coventry, Warwickshire (GB)

(21) Appl. No.: 15/277,516

(22) Filed: Sep. 27, 2016

Related U.S. Patent Documents

Reissue of:
(64) Patent No.: 7,349,776
Issued: Mar. 25, 2008
Appl. No.: 10/249,551
Filed: Apr. 17, 2003

(30) Foreign Application Priority Data

Apr. 18, 2002 (GB) ..... 0208877.1
Dec. 20, 2002 (GB) ..... 0229951.9

(51) Int. Cl.
*G06F 17/00* (2006.01)
*B60K 37/06* (2006.01)

(52) U.S. Cl.
CPC ..... *B60K 37/06* (2013.01)

(58) Field of Classification Search
CPC ..... G06F 17/00; B60K 37/06
(Continued)

(56) References Cited

U.S. PATENT DOCUMENTS 4,569,255 A * 2/1986 Holmes ..... F16H 61/0213 477/123
4,651,290 A 3/1987 Masaki et al.
(Continued)

FOREIGN PATENT DOCUMENTS

DE 3817495 A 11/1989
EP 1028011 A2 8/2000
(Continued)

OTHER PUBLICATIONS

Lexus User Manual; pp. 222-260, undated.
(Continued)

*Primary Examiner* — Michelle Tarae
(74) *Attorney, Agent, or Firm* — Reising Ethington P.C.

(57) ABSTRACT

A vehicle control system has a plurality of subsystem controllers including an engine management system 28, a transmission controller 30, a steering controller 48, a brakes controller 62 and a suspension controller 82. These subsystem controllers are each operable in a plurality of subsystem modes, and are all connected to a vehicle mode controller 98 which controls the modes of operation of each of the subsystem controllers so as to provide a number of driving modes for the vehicle. Each of the modes corresponds to a particular driving condition or set of driving conditions, and in each mode each of the functions is set to the function in mode most appropriate to those conditions.

45 Claims, 10 Drawing Sheets

(58) Field of Classification Search
USPC ..... 701/36
See application file for complete search history.

(56) References Cited

U.S. PATENT DOCUMENTS

| | | | | |
|---|---|---|---|---|
| 4,829,434 | A * | 5/1989 | Karmel et al. | 701/59 |
| 4,922,427 | A | 5/1990 | Yokote et al. | |
| 5,247,831 | A * | 9/1993 | Fioravanti | B60C 11/0332 706/905 |
| 5,275,254 | A | 1/1994 | Shiraishi et al. | |
| 5,289,895 | A | 3/1994 | Takata et al. | |
| 5,355,748 | A * | 10/1994 | Ito | B60K 17/3505 180/248 |
| 5,366,041 | A * | 11/1994 | Shiraishi | B60K 23/0808 180/233 |
| 5,373,912 | A | 12/1994 | Haiki et al. | |
| 5,390,117 | A | 2/1995 | Graf et al. | |
| 5,410,477 | A | 4/1995 | Ishii et al. | |
| 5,470,135 | A | 11/1995 | Shitani et al. | |
| 5,487,002 | A * | 1/1996 | Diller et al. | 701/1 |
| 5,513,107 | A | 4/1996 | Gormley | |
| 5,546,308 | A | 8/1996 | Yamamoto | |
| 5,620,393 | A | 4/1997 | Minowa et al. | |
| 5,651,593 | A | 7/1997 | Shitani et al. | |
| 5,886,650 | A | 3/1999 | Komatsu et al. | |
| 5,911,771 | A | 6/1999 | Reichart et al. | |
| 6,016,457 | A | 1/2000 | Toukura et al. | |
| 6,035,734 | A | 3/2000 | Le Van | |
| 6,044,318 | A * | 3/2000 | Bourdon | F02D 41/2422 123/399 |
| 6,085,137 | A | 7/2000 | Aruga et al. | |
| 6,098,994 | A | 8/2000 | Kunishima et al. | |
| 6,125,314 | A | 9/2000 | Graf et al. | |
| 6,144,295 | A | 11/2000 | Adams et al. | |
| 6,188,945 | B1 | 2/2001 | Graf et al. | |
| 6,255,963 | B1 | 7/2001 | Heimann et al. | |
| 6,268,825 | B1 | 7/2001 | Okada | |
| 6,278,928 | B1 | 8/2001 | Aruga et al. | |
| 6,571,162 | B2 * | 5/2003 | Kusafuka | F16H 61/0213 701/51 |
| 6,591,937 | B2 * | 7/2003 | Badenoch et al. | 180/446 |
| 6,654,671 | B2 * | 11/2003 | Schubert | 701/1 |
| 2004/0036601 | A1 * | 2/2004 | Obradovich | H04L 61/2553 340/540 |
| 2005/0203684 | A1 | 9/2005 | Borgesson | |

FOREIGN PATENT DOCUMENTS

| | | | |
|---|---|---|---|
| FR | 2796893 | A1 | 2/2001 |
| GB | 2273580 | A | 6/1994 |
| GB | 2334700 | A | 9/1999 |
| GB | 2353872 | A | 3/2001 |
| GB | 2357159 | A | 6/2013 |
| JP | H04257759 | A | 9/1992 |
| JP | H054529 | A | 1/1993 |
| JP | H054530 | A | 1/1993 |
| JP | H054531 | A | 1/1993 |
| JP | H0571375 | A | 3/1993 |
| JP | H05213084 | A | 8/1993 |
| JP | H06286436 | A | 10/1994 |
| JP | H06297975 | A | 10/1994 |
| JP | H079976 | A | 1/1995 |
| JP | H079977 | A | 1/1995 |
| JP | H079978 | A | 1/1995 |
| JP | H0932899 | A | 2/1997 |
| JP | H11311332 | A | 11/1999 |
| KR | 1996-0011082 | A | 4/1996 |
| SE | 521017 | C2 | 9/2003 |

OTHER PUBLICATIONS

Mike Weinberg, Understanding The Mitsubishi Montero Active Trac 4WD System, Transmission Digest, dated Nov. 1997, pp. 44-57.

New Lexus LS400 Improves on Excellence, dated Sep. 1998, 22 pages.

Heart-Beat Motors Mitsubishi Motors; Lancer Evolution VII; Press Information 2001.1; pp. 1-30.

Information Disclosure Statement by Applicant, dated Sep. 15, 2016, 3 pages.

* cited by examiner

| | | Motorway | Country Road | City Driving | Towing (On Road) | Dirt Tracks (Developing World Road) | Snow / Ice (Scandanavian/North American Conditions) |
|---|---|---|---|---|---|---|---|
| Suspension Ride Height | High<br>Standard<br>Low | X | X | X | X | X | X |
| Side / Side Air Interconnection | Closed<br>Open | X | X | X | X | X | X |
| Steering Assistance Level | High<br>Low | Speed Proportional | Speed Proportional | Speed Proportional | Speed Proportional | Speed Proportional | Speed Proportional |
| Brake Pedal Efforts | High<br>Low | X | X<br>(X) | X | X | X | X |
| A.B.S. Mode | High mu<br>Low mu<br>'Plough' Surface | X | X | X | X | X | X |
| E.T.C. Mode | High mu<br>Low mu | X (2) | X | X | X | X | X |
| D.S.C. Mode | High mu<br>Low mu | X | X | X | Towing Mode | X | X |
| Throttle Progression | Quick<br>Slow | X | (X)<br>X | X | (X)<br>X | X | X |
| Transfer Box | High Range<br>Low Range | X | X | X | X | X | X |
| Auto Transmission | Normal Mode<br>Performance Mode<br>Snow Mode<br>Sand Mode<br>Manual Mode | X | X<br>(X) | X | X | X | X |
| Centre Diff Lock | Open<br>Locked | X | X | X | X | X | X |
| Rear Diff Lock | Open<br>Locked | X | X | X | X | X | X |

*Fig. 5*

| | | Grass | Sand | Boulder Crossing | Mud |
|---|---|---|---|---|---|
| Suspension Ride Height | High | | | X | |
| | Standard | X | X | | X |
| | Low | | | | |
| Side / Side Air Interconnection | Closed | | | | |
| | Open | X | X | X | X |
| Steering Assistance Level | High | | | X | |
| | Low | Speed Proportional | Speed Proportional | | Speed Proportional |
| Brake Pedal Efforts | High | X | X | | X |
| | Low | | | X | |
| A.B.S. Mode | High mu | | | X | |
| | Low mu | X | | | X |
| | 'Plough' Surface | | X | | |
| E.T.C. Mode | High mu | | | | |
| | Low mu | X | | X | X |
| D.S.C. Mode | High mu | | | X | |
| | Low mu | X | X | | X |
| Throttle Progression | Quick | | X | | |
| | Slow | X | | X | X |
| Transfer Box | High Range | | | | |
| | Low Range | X | X | X | X |
| Auto Transmission | Normal Mode | | | | |
| | Performance Mode | | | | |
| | Snow Mode | X | | | X |
| | Sand Mode | | X | | |
| | Manual Mode | | | X | X |
| Centre Diff Lock | Open | | | | |
| | Locked | X | X | X | X |
| Rear Diff Lock | Open | X | | | |
| | Locked | | (X) | X | X |

*Fig. 6*

VEHICLE CONTROL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF INVENTION

1. Field of the Invention

The present invention relates to the control of vehicles, in particular to the coordinated control of a number of subsystems of a vehicle.

2. Background Art

Various systems are known in which operation of various subsystems of a vehicle can operate in different configuration modes so as to suit different conditions. For example, automatic transmissions can be controlled in sport, winter, economy and manual configuration modes in which the changes between gear ratios and other subsystem control parameters are modified so as to suit the prevailing conditions or the taste of the driver. Air suspensions are known with on-road and off-road configuration modes. Stability control systems can be operated at reduced activity so as to give the driver more direct control over the operation of the vehicle. Power steering systems can be operated in different configurations modes where the level of assistance is at different levels or varies in different ways. Vehicle transmissions can be switched to provide drive to different numbers of wheels. Also the locking or partial locking of differentials can be controlled to suit the prevailing driving conditions.

As the number of controllable systems increases, the driver will become faced with an increasing number of choices as to which configuration modes to select for each of the systems. Unless the driver is very experienced, this can become complicated and confusing.

Therefore, systems have been proposed in which the control of a number of the vehicle subsystems is coordinated by a central vehicle controller, which can be switched between a number of modes thereby controlling all of the subsystems in a coordinated way which is simple for the driver to control. Such a system is disclosed in GB2273580.

While GB2273580 teaches an integrated control system to control and configure vehicle operating subsystems in response to control signals, drivers often encounter a broad range of surfaces and terrains in both on-road and off-road settings. Unfortunately, the operating characteristics of such an integrated control system does not provide the driver with the ability to provide direct input regarding the surface terrain in an attempt to better select the appropriate subsystem configuration modes. This deficiency results in the less than optimal stability, handling, and safety performance of the vehicle. Therefore, to further expand the performance of motor vehicles including integrated control systems as noted above, there is a need for an integrated control system which will provide improved control of the vehicle on a broad range of surfaces.

SUMMARY OF INVENTION

The present invention aims to provide a vehicle control system which can be operated so as to provide improved control of the vehicle on a broader range of surfaces, and in particular in a plurality of different off-road surfaces and terrains such as might be encountered when driving off-road.

Accordingly the present invention provides a vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface.

Preferably each of the subsystems is operable in a plurality of subsystem configuration modes and in each of the driving modes the subsystem configuration modes are selected in a manner suitable for driving on the respective surface.

Preferably one of the subsystems comprises a suspension system and said plurality of subsystem configuration modes comprises a plurality of ride heights.

Preferably one of the subsystems comprises a fluid suspension system in which fluid interconnection can be made between suspensions for wheels on opposite sides of the vehicle, and said plurality of subsystem configuration modes provide different levels of said interconnection.

Preferably one of the subsystems comprises a steering system which can provide steering assistance, and said plurality of subsystem configuration modes provides different levels of said steering assistance.

Preferably one of the subsystems comprises a braking system which can provide braking assistance, and said plurality of subsystem configuration modes provides different levels of said braking assistance.

Preferably one of the subsystems comprises a brake control system which can provide an anti-lock function to control wheel slip, and said plurality of subsystem configuration modes allow different levels of said wheel slip.

Preferably one of the subsystems comprises a traction control system which is arranged to control wheel spin, and said plurality of subsystem configuration modes allow different levels of said wheel spin.

Preferably one of the subsystems comprises a yaw control system which is arranged to control vehicle yaw, and said plurality of subsystem configuration modes allow different levels of divergence of said vehicle yaw from an expected yaw.

Preferably one of the subsystems comprises a range change transmission and said subsystem configuration modes include a high range mode and a low range mode of said transmission.

Preferably one of the subsystems comprises a powertrain system which includes a powertrain control means and a throttle pedal, the subsystem configuration modes providing different levels of responsiveness of the powertrain control means to movement of the throttle pedal.

Preferably one of the subsystems comprises a transmission system operable in a plurality of transmission ratios and including a transmission control means arranged to monitor at least one parameter of the vehicle and to select the transmission ratios in response, and wherein the subsystem modes include a plurality of transmission configuration modes in which the transmission ratios are selected differently in response to said at least one parameter.

Preferably one of the subsystems comprises a differential system operable to provide a plurality of levels of differential lock, and the subsystem configuration modes are arranged to provide different levels of said lock.

Preferably the differential system is arranged to control the level of differential lock on the basis of a plurality of inputs, and to respond differently to said inputs in each of the modes.

The differential may be a center differential, a front differential, or a rear differential.

Preferably one of the subsystems comprises a roll control system arranged to provide roll correction to reduce vehicle roll and the subsystem configuration modes provide different levels of roll correction of the vehicle, at least under some driving conditions.

Preferably one of the subsystems is a speed control system arranged to control the speed of the vehicle when descending a hill. The speed control system may be arranged to control the vehicle to different speeds in the different configuration modes.

Preferably the driving modes include an off-road mode in which the subsystems are controlled in a manner suitable for driving on rough terrain and an on-road mode in which the subsystems are controlled in a manner suitable for driving on-road.

Preferably the suspension system is arranged to provide a higher ride height in the off road mode than in the on-road mode.

Preferably in the off-road mode a higher level of said interconnection is provided than in the on-road mode.

Preferably the traction control system is arranged to allow less wheel spin in the off-road mode than in the on-road mode.

Preferably the yaw control system is arranged to allow a higher degree of said divergence in the off-road mode than in the on-road mode.

Preferably in the off-road mode the range change transmission is operated in the low range.

Preferably in the off-road mode the powertrain control means is arranged to provide lower levels of drive torque, for a given throttle pedal position, at least at low levels of throttle pedal depression, than in the on-road mode.

Preferably the differential system is arranged to provide higher levels of differential lock in the off-road mode than in the on-road mode.

Preferably the roll control system is arranged to provide a higher roll stiffness in the on-road mode than in the off-road mode.

Preferably the speed control system is arranged to be switched on in the off-road mode and switched off in the on-road mode.

Preferably the driving modes include at least one low friction mode in which the subsystems are controlled in a manner suitable for driving on low friction surfaces and a high friction mode in which the subsystems are controlled in a manner suitable for driving on high friction surfaces.

Preferably the brake control system allows higher levels of slip in the high friction mode than in the low friction mode.

Preferably the traction control system allows higher levels of wheel spin in the high friction mode than in the low friction mode.

Preferably the braking control system provides a greater level of braking assistance in the high friction mode than in the low friction mode.

Preferably the powertrain control means is arranged to provide lower levels of drive torque, for a given throttle pedal position, at least at low levels of throttle pedal depression, in the low friction mode than in the high friction mode.

Preferably the transmission system is arranged to operate in higher gears for a given value of said at least one parameter in the high friction mode than in the low friction mode.

Preferably the differential system is arranged to provide higher levels of differential lock in the low friction mode than in the high friction mode.

The high friction mode may comprise a standard or default mode in which the vehicle will operate normally and which is suitable for on-road driving.

Preferably there are two such low friction modes and the suspension system is arranged to provide a higher ride height in one of the low friction modes than in the other.

Preferably there are two such low friction modes and the suspension system is arranged to provide a higher level of said cross linking in one of the low friction modes than in the other.

For example the two low friction modes may comprise a mud mode suitable for traveling through deep mud, and another low friction mode suitable for driving in snow, on grass, or on gravel.

Alternatively there may be a plurality of low friction modes, one of which may be a grass mode in which the subsystems are controlled in a manner suitable for driving on grass, one of which may be an ice mode in which the subsystems are controlled in a manner suitable for driving in ice, and one of which may be a mud mode in which the subsystems are controlled in a manner suitable for driving on mud.

Preferably one of the modes is a sand mode in which the subsystems are controlled in a manner suitable for driving on sand. Preferably at least one of the subsystems is arranged, in the sand mode, to allow only relatively low levels of wheel spin when the vehicle is traveling at low speeds so as to avoid the vehicle wheels becoming submerged in sand, but to allow relatively high levels of wheel spin when the vehicle is traveling at higher speeds.

Preferably the powertrain control system is arranged to provide relatively low levels of drive torque for a given throttle pedal position at low vehicle speeds and to provide relatively high levels of drive torque for a given throttle pedal position at higher vehicle speeds.

The off-road mode may be a rock crawl mode in which the subsystems are controlled in a manner suitable for driving over rocks. Alternatively it may be set up for more general off-road use.

One of the modes may be a rough-road mode in which the subsystems are controlled in a manner suitable for driving on rough roads, for example for driving at relatively high speeds over rough surfaces.

At least one of the modes may be a plough surface mode in which the brake control subsystem is arranged to allow a relatively high degree of wheel slip under braking. This is useful, for example on snow or sand, where the build up of matter in front of the wheels under braking can improve braking performance.

Preferably at least one of the modes is an on-road mode in which the subsystems are controlled in a manner suitable for driving on-road. For example, one of the modes may be a motorway mode in which the subsystems are controlled in a manner suitable for driving at high speed on a flat road surface, or one of the modes may be a country road mode in which the subsystems are controlled in a manner suitable for driving on country roads.

The driving modes may be selectable by means of two inputs, one of which is a terrain selection input arranged to influence the mode selected on the basis of the terrain selected, and the other which is a mode of use input arranged to influence the mode selected on the basis of a selected mode of use of the vehicle. Each of these inputs may be user-controlled inputs, or may be derived from one or more sensors.

The mode of use input may be arranged to allow selection between a plurality of driving styles, which may include, for example, a normal style, a sport style, and an economy style.

Alternatively, or in addition, the mode of use input may be arranged to allow selection between a plurality of states of the vehicle, for example including a towing state or a loaded state.

The present invention further provides a vehicle comprising a system according to the invention and said plurality of subsystems. Preferred embodiments of the present invention will now be described by way of example only with reference to the accompanying drawings and the appended claims.

BRIEF DESCRIPTION OF DRAWINGS

FIGS. 5 and 6 make up a table showing operation of the vehicle mode controller of FIG. 4;

DETAILED DESCRIPTION

Figure 1:
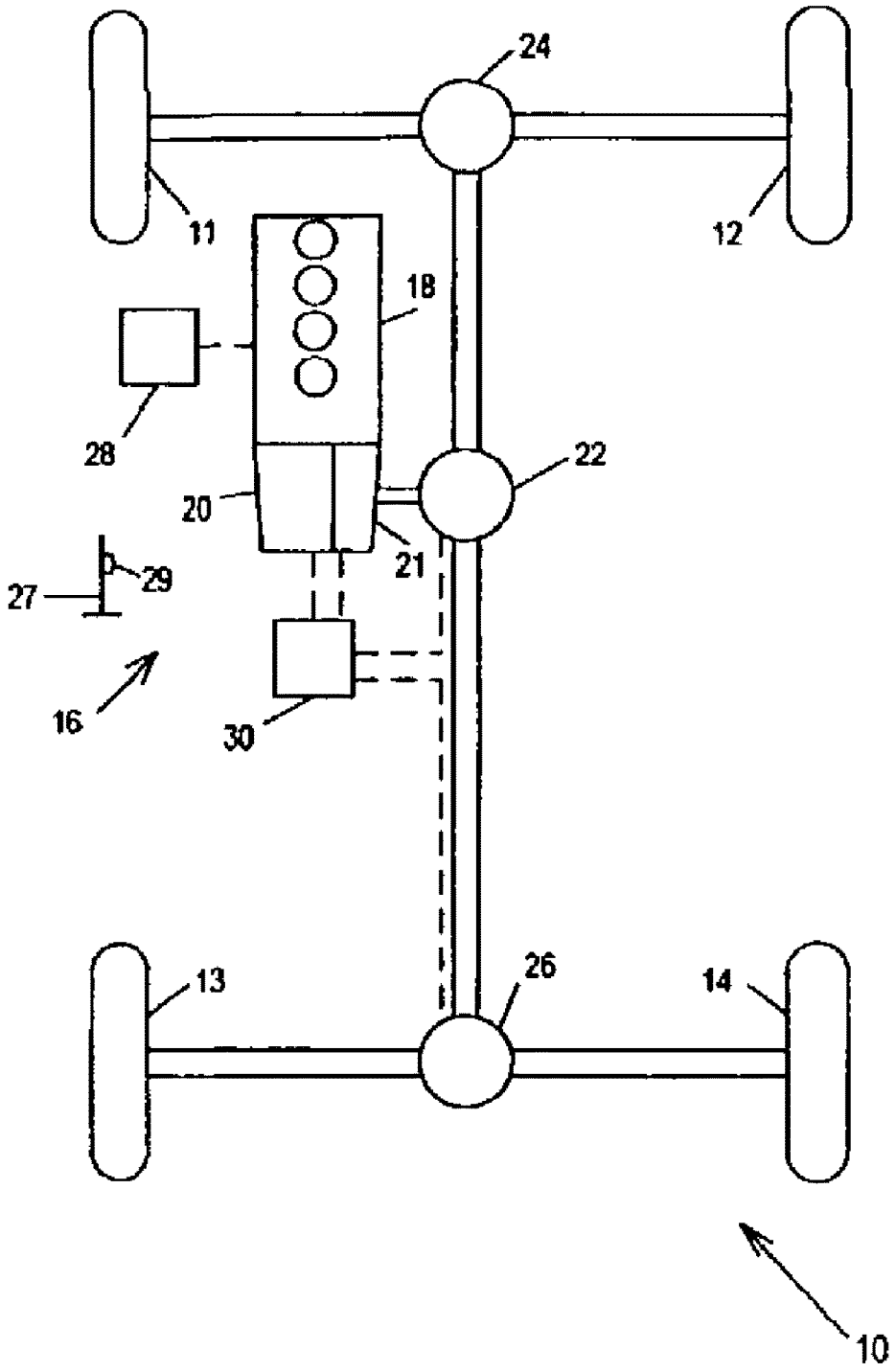
FIG. 1 is a diagrammatic representation of a powertrain subsystem of a vehicle according to an embodiment of the invention.

Referring to FIG. 1, according to a first embodiment of the invention a vehicle 10 has four wheels 11, 12, 13, 14 and a powertrain 16 for providing driving torque to the wheels. The powertrain 16 comprises an engine 18, an automatic transmission 20 which transmits drive torque at any of a number of transmission ratios, via a transfer box 21 to the input side of a center differential 22. Front and rear differentials 24, 26 receive torque from the center differential 22 and transmit it to the front wheels 11, 12 and rear wheels 13, 14 respectively. An engine controller 28 in the form of an engine management system controls operation of the engine 18 so as to control its speed and output power and torque in response to inputs from the driver from a throttle pedal 27, the position of which is measured with a throttle pedal position sensor 29. A transmission controller 30 controls the transmission ratio of the automatic transmission 20, and the selection of high or low range in the transfer box 21. It also controls the center differential 22 so as to control the distribution of drive torque between the front and rear axles, and the rear differential 26 so as to control the distribution of drive torque between the two rear wheels 13, 14. The transmission controller 30 could also control the distribution of drive torque between the front two wheels 13, 14.

Figure 2:
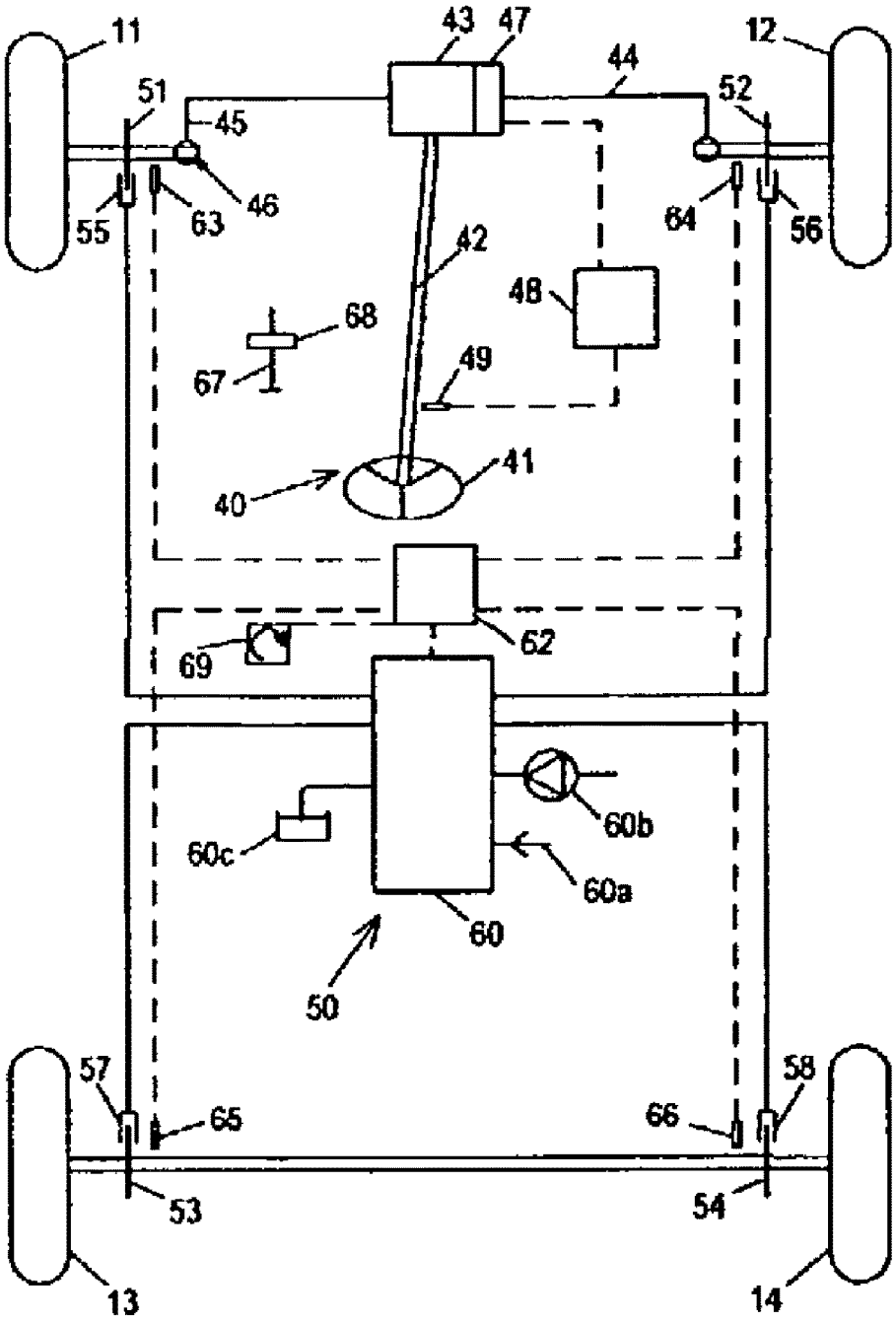
FIG. 2 is a diagrammatic representation of steering and brakes subsystems of the vehicle of FIG. 1.

Referring to FIG. 2, the vehicle further comprises a steering system 40 for steering the front wheels 11, 12, and a brake system 50 for braking all four wheels 11, 12, 13, and 14. The steering system 40 comprises a steering wheel 41, a steering column 42 for transmitting steering input torque input by the driver to the steering wheel to pinion 43 of a rack and pinion steering system. The pinion 43 transmits the steering torque to a rack 44, which is connected to steering arms 45 by means of which it applies a steering force to the steering knuckles 46 of the front wheels to steer them. A PAS (power assisted steering) motor 47 applies steering forces to the rack 44 to assist the driver in steering the vehicle, under the control of a steering controller 48 which receives inputs from a steering angle sensor 49, which measures the steering angle of the steering wheel 41.

The brake system 50 comprises a brake disk 51, 52, 53, 54, and a brake caliper 55, 56, 57, 58 for each of the wheels each of which is actuated hydraulically from a hydraulic brake control block 60. The hydraulic control block 60 controls the hydraulic pressure and hence the braking torque at each wheel under the control of a brake controller 62 which receives wheel speed signals from wheels speed sensors 63, 64, 65, 66 at each of the wheels. A driver operated brake pedal 67 provides via a master cylinder the driver input to the brake system 50 and creates hydraulic pressure to operate the brakes at a first inlet port 60a to the control block 60, with the assistance of a brake booster 68. The booster 68 is also controlled by the controller 62 so as to vary the amount of assistance provided by the brake booster 68 and therefore the level of braking effort required from the driver to produce any particular level of braking torque at the wheels. A pump 60b is also provided which can provide hydraulic pressure to actuate the brakes independently of the brake pedal. The pump 60b is also controlled by the controller 62. Brake fluid is returned to a reservoir 60c on return from the brake calipers 55, 56, 57, and 58 from where it is supplied to the pump 60b or the master cylinder operated by the brake pedal 67. The brake controller 62 also receives an input from a yaw sensor 69 which measures the yaw rate of the vehicle.

Figure 3:
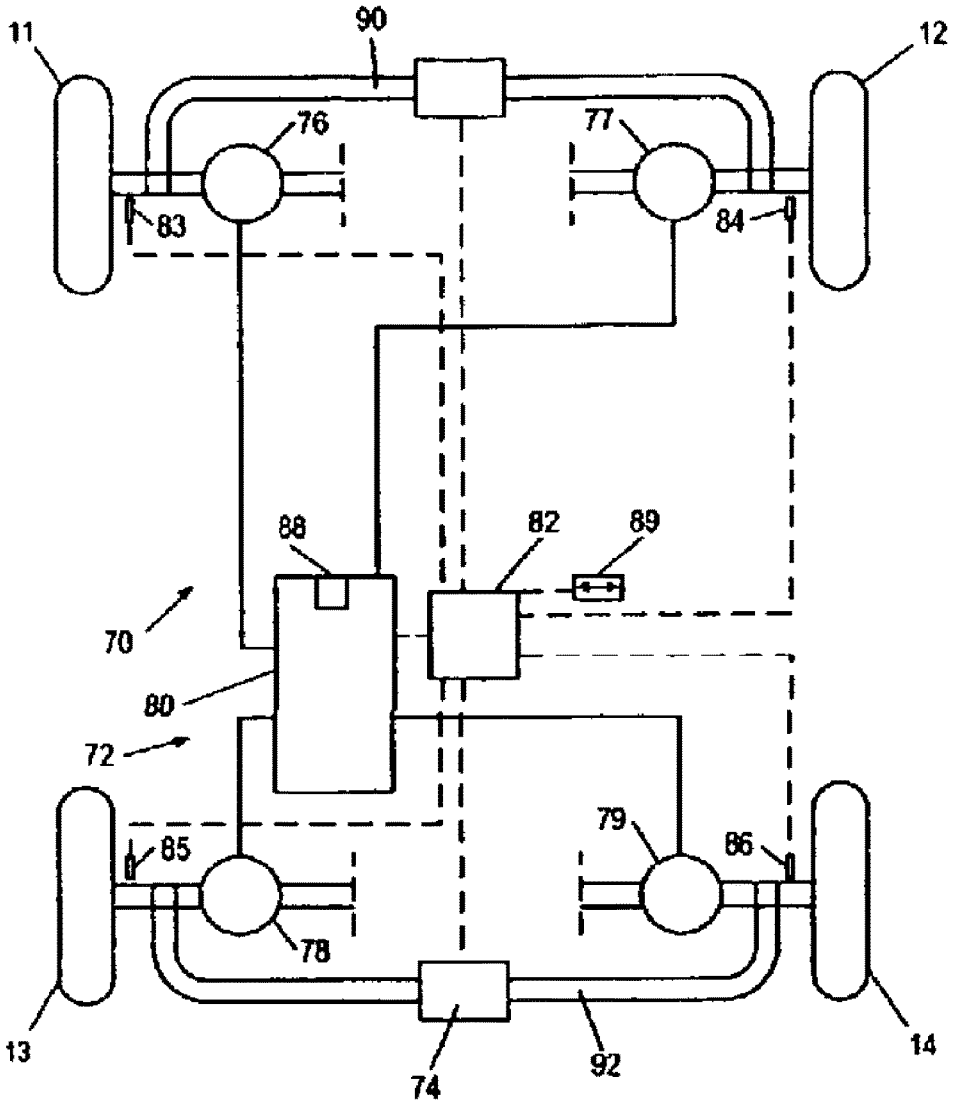
FIG. 3 is a diagrammatic representation of a suspension subsystem of the vehicle of FIG. 1.

Referring to FIG. 3, the vehicle further comprises a suspension system 70 which includes an active air suspension system 72 and an active roll control system 74. The active air suspension system 72 comprises an air spring 76, 77, 78, 79 at each wheel, and a valve block 80 which controls the ride height of each of the wheels 11, 12, 13, 14 and the spring rates of the air springs 76, 77, 78, 79 by controlling the air pressure in each of the air springs, the supply of air under pressure to each of the air springs and the release of air from the air springs. The valve block 80 further controls the degree to which the two front air springs 76, 77 are interconnected, the degree to which the rear air springs 78, 79 are interconnected, and the degree to which the front air springs 76, 77 are interconnected to the rear air springs 78, 79. The valve block 80 is controlled by an air suspension controller 82 which receives ride height signals from ride height sensors 83, 84, 85, 86 arranged to measure the ride height of each of the wheels 11, 12, 13, 14. The suspension controller 82 can also measure the air pressure in each of the air springs 76, 77, 78, 79 using a pressure sensor 88 in the valve block 80, as well as the lateral acceleration of the vehicle using a lateral accelerometer 89.

The active roll control system 74 comprises a front anti-roll bar 90 which is connected between the two front wheels 11, 12 and acts to resist roll of the front of the vehicle, and a rear anti-roll bar 92 which is connected between the two rear wheels 13, 14 and acts to resist roll of the rear of the vehicle. Each of the anti-roll bars 90, 92 is in two halves with a rotary actuator 94, 96 acting between the two halves. These roll control actuators can actively increase (or decrease) the resistance to roll provided by the anti-roll bars by applying a roll correction torque under the control of the suspension controller 82. They can therefore control the roll stiffness of the vehicle.

Within the systems described above there are various functions which can be controlled in different ways depending on the prevailing driving conditions. These functions will now be described.

The suspension system 70 is adjustable between a plurality of ride heights. In this case there are three possible ride heights: "high" which is suitable for off-road driving; "low" which is suitable for high speed driving, for example on motorways, where a low wind resistance is required; and "standard" which is between the "high" and "low" settings and is suitable for most normal on-road driving.

The interconnection between air springs of the active air suspension system 72 on opposite sides of the vehicle is variable between an "open" condition where there is interconnection between the two sides of the vehicle, and "closed" where there is no interconnection. In the "closed" condition the roll stiffness of the vehicle is increased, and so is the overall spring rate of the suspension. This therefore makes the vehicle more suitable for driving on smooth surfaces at higher speeds. In the "open" condition the roll stiffness is decreased, but the suspension can articulate more easily, making it more suitable for driving on rougher surfaces and at lower speeds. The interconnection valves are normally kept in the closed condition to provide high roll stiffness and stabilize the vehicle. Under certain conditions when there is a lot of vertical wheel travel the interconnection valves are opened to reduce resistance to this travel. However the system also needs to close the interconnection at high vehicle speeds to stabilize the vehicle because opening the interconnection reduces resistance to roll as well as resistance to articulation. The system can be varied to vary the amount of wheel travel that is required to cause opening of the interconnection valves, so that the interconnection will open more or less easily, and to vary the vehicle speed above which the interconnection will be kept closed. The system has three settings: standard, medium and maximum. In the standard setting the interconnection will happen up to quite high speeds, of about 50 kph but only at quite high levels of articulation. In the medium setting the interconnection will occur only at lower speeds, but also at lower levels of articulation. In the maximum setting interconnection will occur only up to low speeds, of about 15 kph, but at even lower levels of articulation.

The brake pedal effort is controllable according to a plurality of, in this case two, basic characteristics. These are "high" and "low" requiring relatively high and low levels of braking effort from the driver. However further brake control functions can also be added to these basic characteristics under certain circumstances. For example a "panic assist" function detects very rapid brake pedal depression indicative of emergency braking and provides an increased level of braking assistance in response.

The brake controller 62 provides an ABS (anti-lock) function which is also operable in a number of different configuration modes. There is a "high mu" mode for use on surfaces with a high coefficient of friction. In this mode a relatively high level of slip is allowed to maximize deceleration rates. There is also a "low mu" mode in which only much lower levels of slip are allowed so as to ensure that good control over the vehicle will be maintained at all times. Finally there is also a "plough" mode which is designed for surfaces, such as sand and snow, in which a barrier of matter will build up in front of a wheel which is slipping under braking. In this mode higher levels of slip are allowed even than in the "high mu" mode to take advantage of the braking effect of the build up of material in front of the wheels.

The brake controller 62 and the engine management system 28 also provide an E.T.C. (electronic traction control) function in which the brakes are applied using the pump 60b to counteract wheel spin caused by the powertrain 16 applying more torque to one or more of the wheels than can be transmitted through the tires to the ground. The detection of wheel spin is carried out using the wheel speed sensors 63, 64, 65, 66. If just one of the wheels is spinning, then that wheel is braked under the control of the brake controller 62. If enough of the wheels are spinning to indicate that the overall drive torque is too high for the surface on which the vehicle is traveling, the engine management system 28 intervenes to reduce the overall power output of the engine 18, thereby reducing wheel spin and maintaining traction. The E.T.C. function has "high mu" and "low mu" modes which, in similar manner to the A.B.S. function, allow higher and lower degrees of wheel spin, or slip, to allow more aggressive driving on higher friction surfaces, but maintain control on lower friction surfaces.

The E.T.C. function also has a sand mode which keeps wheel spin low at low speeds, following the "low mu" mode, to prevent the wheels from digging into the sand, but allows more spin at higher speeds, following the "high mu" mode because at higher speeds on sand higher levels of wheel spin are less of a problem and can even improve traction.

The brake controller 62 also provides a D.S.C. (dynamic stability control) function. This function monitors the vehicle speed and the steering angle using the wheel speed sensors 63, 64, 65, 66 and the steering angle sensor 49 and determines the expected yaw rate of the vehicle. This is compared with the actual yaw rate as measured by the yaw sensor 69, and the brakes are applied at individual wheels to control the vehicle yaw if it starts to deviate in an undesirable way from the expected yaw. Braking one or more of the outside wheels on a corner helps to neutralize oversteer, and braking one or more of the inside wheels on a corner helps to neutralize understeer. This function also has "high mu" and "low mu" modes in which the level of yaw deviation allowed is relatively high and relatively low respectively.

The throttle pedal characteristic, which relates the amount of torque provided by the engine 18 to the position of the throttle pedal 27, can take a number of different forms. These include "quick" characteristic which is highly progressive, causing the torque to increase rapidly at low degrees of pedal displacement and then to increase more slowly at higher degrees of pedal displacement, and a "slow" characteristic in which the torque increases more slowly at lower levels of pedal displacement and more quickly at higher levels of pedal displacement. In an alternative to this type of arrangement the throttle pedal characteristic may relate the vehicle speed directly to the throttle pedal position.

In this case the rate at which vehicle speed varies with throttle pedal position can be varied between more and less progressive characteristics.

The transfer box 21 can be shifted between a "high range" and a "low range" to select the range of gear ratios most suitable to the prevailing conditions in known manner.

The automatic transmission 20 has a number of configuration modes each of which defines when shifts between gears will take place, in response to changes in throttle pedal position, vehicle speed, engine speed, engine torque and throttle pedal position, and some other factors which are occasionally relevant such as gearbox temperature and ambient temperature. There is a "normal" mode which provides a reasonable compromise between fuel economy and driving performance, a "performance" which generally keeps the transmission in lower gears than in the normal mode, particularly when the driver is requesting a high level of driving torque to accelerate the vehicle, and a "manual" mode in which the control of gear changes is given completely to the driver. There is also an "ice" mode which generally keeps the transmission in higher gears than the normal mode, in particular under acceleration from rest, to avoid loss of traction due to wheel spin, and a "sand" mode which keeps the transmission in relatively high gears at low speed to avoid excessive wheel spin which can result in the wheels digging themselves into the sand, but uses relatively low gears at higher speeds where a relatively high degree of wheel slip can be desirable to provide maximum traction, and lower gearing helps the engine 18 to remain in an operating region where the engine speed is high and the power output is high, thereby helping to avoid the vehicle becoming "bogged down" by a lack of power.

The center differential 22 and the rear differential 26 each include a clutch pack and are controllable to vary the degree of locking between a "fully open" and a "fully locked" state. The actual degree of locking at any one time is controlled on the basis of a number of factors in a known manner, but the control can be adjusted so that the differentials are "more open" or "more locked". Specifically the pre-load on the clutch pack can be varied which in turn controls the locking torque, i.e. the torque across the differential that will cause the clutch, and hence the differential, to slip. The front differential could also be controlled in the same way.

Figure 4:
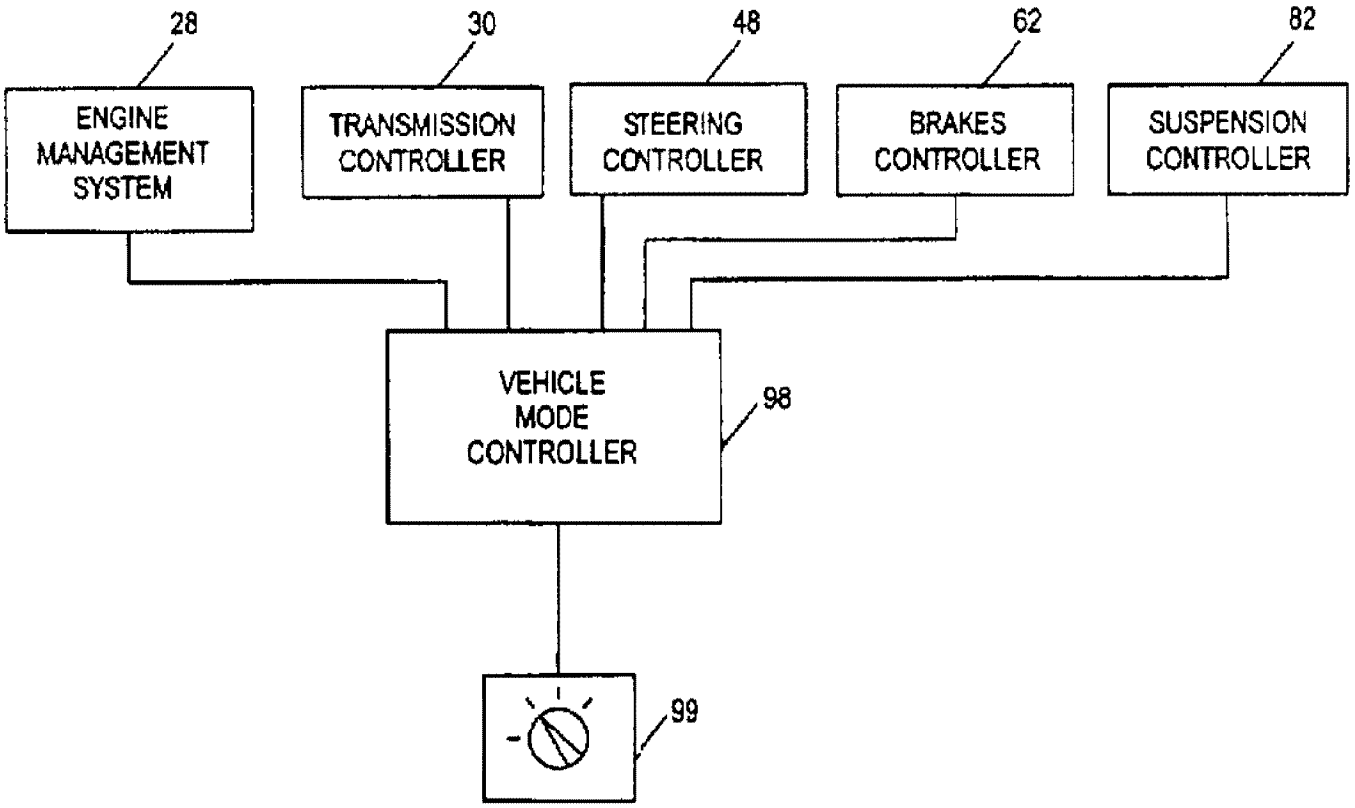
FIG. 4 is a diagrammatic representation of a vehicle mode controller controlling the subsystems of FIGS. 1 to 3.

Referring to FIG. 4, all of the subsystem controllers, that is the engine management system 28, the transmission controller 30, the steering controller 48, the brakes controller 62 and the suspension controller 82 are all connected to a vehicle mode controller 98 which controls the configuration modes of operation of each of the subsystem controllers. In one example, the vehicle mode controller 98 stores input regarding driving conditions in its memory and provides the appropriate control commands to each subsystem controller. The subsystems, and each of the functions described above, are controlled so as to provide a number of driving modes for the vehicle. Each of the driving modes corresponds to a particular driving condition or set of driving conditions, and in each driving mode each of the functions is set to the function mode most appropriate to those conditions.

The driving modes are selected by means of a driver input 99 which takes the form of a rotary knob which can be rotated by the driver to select any of the driving modes displayed as being available. As an alternative to this rotary knob a touch screen, or a number of push buttons, one for each driving mode, could be used.

Referring to FIGS. 5 and 6, the driving modes include three on-road modes, namely a motorway mode, a country road mode and a city driving mode, four off-road modes, namely a grass mode, a sand mode, a boulder or rock crawl mode and a mud mode, and also a rough road mode, a towing mode, which in this case is arranged for towing on-road and can therefore also be considered one of the on-road modes, and an ice mode. The function modes that these vehicle driving modes include are as follows.

When the vehicle mode controller 98 is in "motorway" mode the vehicle functions and subsystem configurations are optimized for traveling at high speeds on flat surfaces with good levels of friction. The suspension ride height is set at "low" for low wind resistance and good stability. The air suspension interconnection is set at "standard" for good stability. The steering assistance is set so that it will be low at high speeds to give a firm steering feel, but will be speed dependent and increase at low vehicle speeds. The brake pedal effort is set at "high" to avoid rapid deceleration at high speed, but with "panic assist" to ensure that the vehicle can be slowed rapidly in an emergency. The A.B.S, E.T.C and D.S.C are all set to "high mu". The throttle progression is set to the "slow" characteristic because this is actually more responsive to changes in throttle pedal position at higher levels of pedal displacement which will generally be used on a motorway. The transfer box 21 is set to "high range", the transmission is set to "normal mode" and the center and rear differentials are both "more open".

When the vehicle mode controller 98 is in "country road" mode the function settings are the same as for the "motorway" mode, except for the suspension ride height and the transmission. The suspension ride height is set to "standard" because reduced wind resistance is less important and the road may be rougher requiring more ground clearance and more suspension bump travel. The transmission is set to "performance" mode, but the driver has the option of selecting "manual" mode. In an alternative in the country road mode, the throttle progression is set to "quick" and the brake effort set to "low" so as to assist the driver with rapid acceleration and braking.

When the vehicle mode controller 98 is in "city driving" mode, the function settings are again the same as for the "motorway" mode except the suspension ride height and the brake pedal effort. The ride height is set to standard and the brake pedal effort is set to low to assist the driver with the rapid and frequent starting and stopping associated with city driving. The transmission is set to use relatively high gears such as by using the "ice" mode so as to reduce the jerkiness of driving, and can even be set to start in second gear rather than first for the same reason. The throttle is set to the "slow" mode, again to reduce jerkiness. The throttle pedal characteristic is also set to high degree of damping, which uses a low-pass filter on the throttle pedal position signal so that if the pedal is moved quickly, the engine torque does not change as quickly. This also helps to reduce jerkiness. In some cases it might be preferred to use the "quick" mode characteristic with a high degree of damping so as to reduce the amount of pedal movement required from the driver, but still minimize jerkiness.

When the vehicle mode controller 98 is in "towing" mode, this is assumed to be on-road towing and therefore many of the functions are again similar to the other on-road modes. Specifically all of the functions are at the same settings as in "motorway" mode, except the suspension ride height, the D.S.C., and the transfer box. The ride height is again set to "standard". The D.S.C. is operated in a special "towing" mode which is designed to counteract instability brought about by the trailer. The transfer box 21 is in "high range" since towing will generally be carried out on-road. As an alternative to the selection of "high range" the transmission could be operated in a different configuration mode to help the vehicle to manage heavy towed loads. This could be using the "performance" mode which would tend to keep the transmission in lower gears than normal to help with pulling away under heavy loads. In an alternative towing mode the throttle pedal progression is set to "quick" so as to help avoid stalling on pull-away from rest.

When the vehicle mode controller 98 is in "dirt track" mode many of the vehicle functions will need to be in different configuration modes from the on-road modes described above to take account of the fact that the surface is rough, although the vehicle might still be traveling at quite high speeds, so stability is still important. The ride height is set to "standard". This is a compromise between being higher to give more suspension travel to accommodate the rough surface, and being lower for better stability. The air suspension interconnection is set to "medium" for good stability. However, if it is assumed that the dirt track will be very rough the interconnection could be set to "maximum" to accommodate the rough surface. The steering assistance is set to be speed dependent as in the motorway driving mode. The brake pedal effort is set to "high" to avoid sudden braking resulting from the jolting of the vehicle due to the rough surface. The A.B.S., E.T.C. and D.S.C. are all set to "low mu" because dirt tracks generally have a relatively high amount of loose material on them, and the friction is therefore generally quite low. The throttle progression is set to "slow" to avoid the jolting of the vehicle, and the resulting bouncing of the driver's foot on the accelerator pedal from producing undesired changes in the demanded level of torque. The transfer box 21 is in "high range" because speeds will generally be reasonably high. The transmission is in "normal" configuration mode for the same reason. The differential locks are both set to "more open".

When the vehicle mode controller 98 is in "ice" mode, the functions are set up to provide maximum stability on a slippery surface. The ride height setting is not critical to this requirement, but is set to "standard" configuration mode for the same reasons as in "dirt track" driving mode. The air suspension interconnection is set to "standard" to give good stability. The steering assistance is set to a low level of assistance because steering tends to become very "light" on ice and reducing the assistance will reduce the tendency of the driver to change the steering angle too much and too quickly. The brake pedal effort is set to "high" to avoid sudden braking which might reduce stability. The A.B.S., E.T.C. and D.S.C. are all set to "low mu" to maintain stability. The throttle progression is set to "slow" to avoid too rapid changes in torque demand which could cause wheel spin. The transfer box 21 is set to high range because speeds might still be relatively high, particularly if the vehicle is being driven on snowy roads. The automatic transmission 20 is set to "ice" mode configuration mode described above. Both of the differentials are set to "more open" for maximum stability.

'Grass' driving mode is similar to 'ice' driving mode because both are reasonably flat surfaces with low friction. Therefore many of the functions are in similar configuration modes to the "ice" mode. The differences are that the air suspension interconnection is set to "medium" or "maximum" to give better articulation which helps to improve traction, the transfer box 21 is in "low range" because driving speeds will generally be low on grass, and the center differential 22 is set to "more locked" to improve traction, in particular when climbing and descending hills. The rear differential 26 could be closed to improve traction, but this would adversely affect stability under some circumstances. It can therefore be closed at low speeds, but open increasingly as speed increases, for example above a threshold of 15 or 20 kph, to increase stability.

In "sand" driving mode the functions are the same as for "grass" mode configuration modes except the A.B.S., throttle progression and transmission. The A.B.S. is in the "plough surface" mode described above. The throttle progression is set to "quick" and the transmission is in the specifically designed "sand" mode described above. The E.T.C. is also set to the "sand" mode. The differentials are set to a standard setting.

In "boulder" driving mode the vehicle will generally be traveling at very low speeds and the chances of complete loss of traction at one or more wheels is quite high. The suspension is set to "high" to give good ground clearance. The air suspension interconnection is set to "maximum" to give good articulation. The steering assistance is set to high because required steering torques can be high. The A.B.S. is set to "high mu", although another possibility is to operate the A.B.S. in a de-sensitized mode. In this mode, at least at low speed and when the steering angle is low, i.e. the driver is steering straight, very high levels of slip, or even total wheel lock are allowed. However, as the steering angle increases above a set limit indicating that steering is required, wheel lock is again prevented to improve steering control. The E.T.C. is set to "low mu" because wheel spin is very likely to occur. Another option is to provide a special E.T.C. mode in which the brakes are pre-pressurized either permanently or when high degrees of wheel articulation are detected, to pre-empt the occurrence of wheel spin. The D.S.C. is set to "high mu" because it is unlikely that it will be used. Again, another option here is to disable the D.S.C. function altogether, at least below a relatively low threshold speed of, for example, 10 or 15 kph. The throttle progression is set to "slow" to give the driver the best possible control at low speeds. The transfer box 21 is set to "low range". The automatic transmission 20 is set to "manual mode" because it is unlikely that the driver will want to change gear at all, and any undesired change of gear might affect the stability of the vehicle. The center and rear differentials are both set to "more locked" to give good traction.

Finally, in "mud" driving mode the functions are set to the same settings as in "grass" driving mode, except for the suspension ride height which is set to "high" to give better clearance over deep mud, and the rear differential 26 which is set to "more locked" to give better traction. The air suspension interlock can also be set to "maximum" in order to maximize traction.

A second embodiment of the invention will now be described. In this embodiment all of the subsystem configurations are substantially the same as in the first embodiment, the second embodiment differing only in the manner in which the subsystems configurations are controlled. Some of the controlled functions described above are not altered by the driving mode selected, and one further function, a hill descent function, is included in the brake controller 62, as will be described in more detail below. The second embodiment will therefore also be described with reference to FIGS. 1 to 4.

In the second embodiment the functions which are controlled by the vehicle mode controller 98 are the throttle pedal characteristic, the gear changes in the transmission 20, the locking torque of the center and rear differentials 22, 26, the traction control function, the yaw control function provided by the D.S.C. system, the air suspension ride height, the suspension cross linking, and the hill descent control function. The hill descent control defines a target speed and uses the brakes to control the vehicle speed to the target speed as the vehicle descends a hill. The target speed has a default value which is nominally 6 kph, but can be increased by depressing the accelerator pedal 27 and decreased by depressing the brake pedal down to a minimum value of 3 kph. The default target speed can be varied depending on the mode selected. The differential controller 30 is also arranged to receive inputs from the steering angle sensor 49 and the ride height sensors 83, 84, 85, 86, and to vary the locking torque of each of the center and rear differentials 22, 26 in response to those inputs. When high steering angles are detected the locking torque, in particular of the rear differential 26 26, is reduced so as to allow the wheels to rotate at different speeds as is required under cornering. When high levels of suspension articulation, indicated by large differences is ride heights between the wheels, is detected, the locking torque is generally increased as there is an increased likelihood of wheels slipping.

The driving modes which are selectable in the second embodiment are: a standard mode, a grass/gravel/snow mode, a mud/ruts mode, a sand mode, a rock crawl (boulder) mode, and a dynamic mode. The control of the vehicle in each of these modes will now be described.

Figure 7:
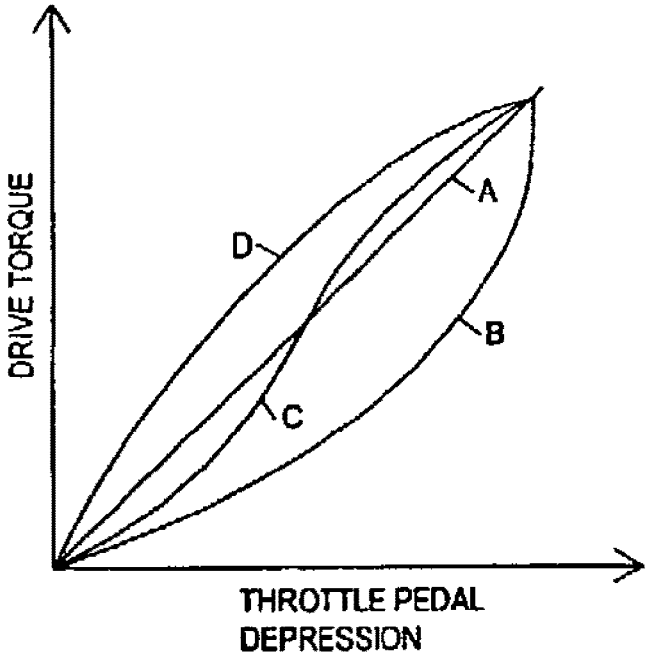
FIG. 7 is a graph showing throttle characteristics in a second embodiment of the invention.
Figure 8:
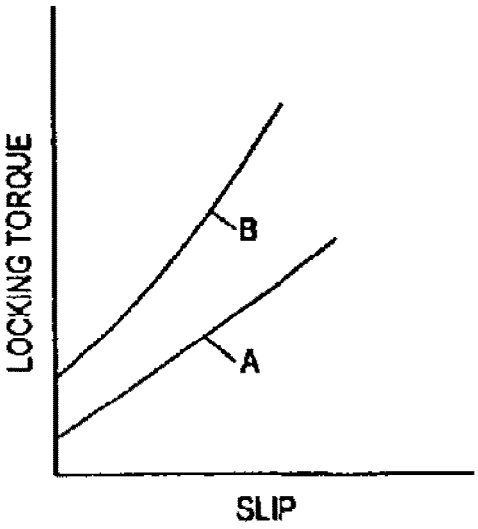
FIGS. 8 and 9 are graphs showing control of differentials forming part of the second embodiment.
Figure 9:
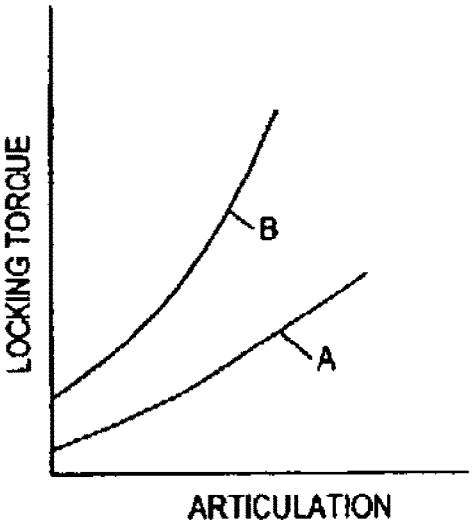
Figure 10:
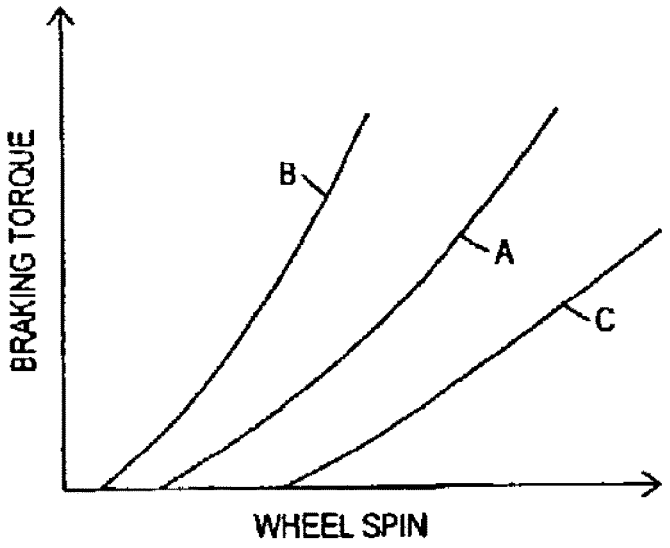
FIG. 10 is a graph showing traction control characteristics in the second embodiment
Figure 11:
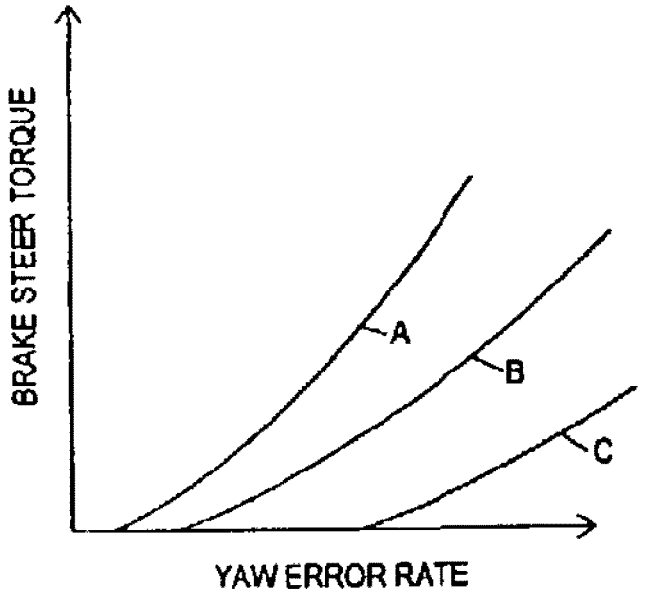
FIG. 11 is a graph showing yaw control characteristics in the second embodiment.

In the standard driving mode, the configuration modes for the various systems are designed to be a compromise that will be suitable for all conditions. The throttle characteristic, gearbox control, traction control and DSC are set to be suitable for normal on-road driving. Referring to FIG. 7 the throttle characteristic, which relates engine drive torque to throttle pedal depression, is indicated by curve A which provides a steady increase in torque with increasing throttle depression. The differentials are also controlled in a manner suitable for normal on-road driving. Referring to FIG. 8 the differential locking torque is arranged to start at a pre-load level and increase gradually with slip across the differential as shown in curve A. Referring to FIG. 9, the locking torque is also arranged to increase gradually with suspension articulation as indicated by curve A. The differential controller are also arranged to give a degree of yaw control via the rear differential 26. The HDC system is switched off, the suspension ride height is set to standard ride height and the suspension cross linking is set to its minimum. Referring to FIG. 10, the traction control is arranged to provide a braking torque to any wheel which is detected as spinning, the torque starting when the spinning reaches a predetermined threshold level, and increasing gradually with increasing wheel spin as indicated by curve A. Referring to FIG. 11, the D.S.C. system is arranged to provide a steering torque by applying a differential in braking torque between the two sides of the vehicle. This brake steering torque starts when the yaw error rate, which is the difference between the expected yaw rate and the measured yaw rate, reaches a predetermined level and increases with increasing yaw error rate as shown by curve A.

The grass/gravel/snow driving mode is intended for use on grass, gravel and snow and other low friction surfaces into which the wheels of the vehicle will not sink to a significant depth. In this driving mode the throttle characteristic is set to provide a gentle response, that is a low increase in drive torque for any change in throttle pedal position over most of the range of throttle pedal position, as shown by curve B. At high levels of pedal depression the torque increases at a more rapid rate so that the maximum torque can be achieved at full throttled pedal depression. This characteristic is arranged to avoid wheel spin by giving a gentle response within the normal range of throttle pedal positions. The gearbox control is also arranged to avoid wheel spin, and is therefore arranged to change up gears relatively early, i.e. at relatively low throttle pedal depressions and engine speeds, and to change down gears relatively late, i.e. at relatively low engine speeds. The differentials are arranged to have an increased locking torque generally, compared to the standard driving mode, as shown by curve B in FIG. 8, so as to reduce the amount of wheel spin which is more likely to occur on low friction surfaces. The differential controller 30 is also arranged to respond more rapidly to detected slipping of the differentials, increasing the locking torque more rapidly in response to detected slip of the differentials than in the standard mode. The response of the differentials to suspension articulation is the same as in standard mode. The traction control is arranged to respond more quickly to wheel spin, as shown by curve B in FIG. 10, by braking spinning wheels more rapidly and therefore allowing less spin than in the standard mode. The braking starts at lower levels of spin and increases more rapidly with increasing spin, compared to the standard mode. The engine intervention within the traction control is switched on so as to further reduce the likelihood of wheel spin. The D.S.C. system is set up as for the standard mode. The hill descent control function is switched on with a low default target speed of, for example, 3 or 4 kph to improve control of the vehicle when descending hills in slippery conditions. The suspension ride height is set to standard, and the suspension cross linking is set to standard since on these surfaces high degrees of articulation are not expected. Alternatively the cross linking could be set to medium or even maximum to improve traction, provided the cut-out speed at which the interconnection is closed is low to avoid loss of stability.

Figure 12:
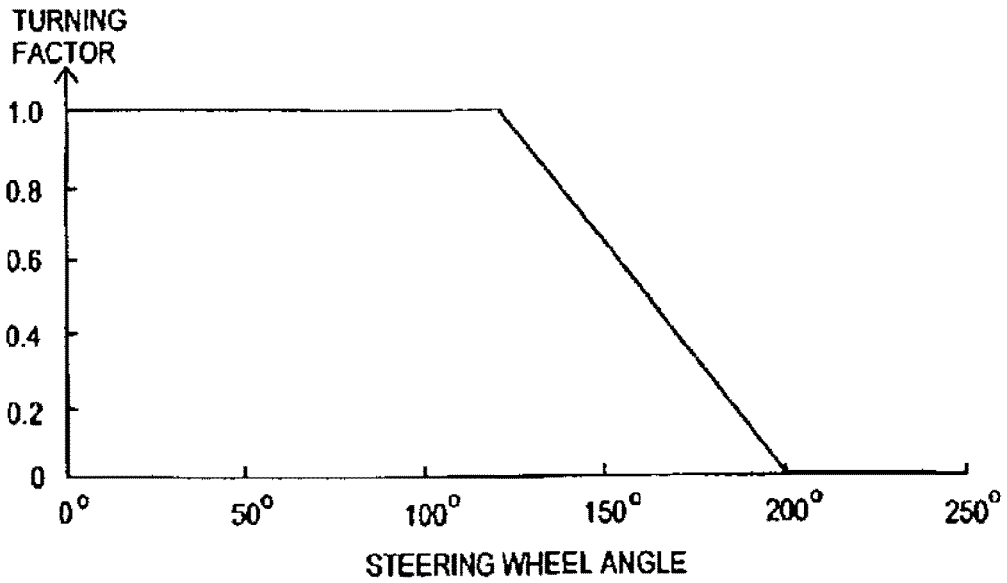
FIG. 12 is a graph showing control of the differentials of the second embodiment.

In the mud/ruts driving mode, the throttle characteristic, gearbox control, differential control and stability control are the same is in grass/gravel/snow driving mode. The traction control is also the same except that the engine intervention is switched off, or at least minimized. The differential control is the same as for grass/gravel/sand driving mode, but the sensitivity of the control to changes in steering angle is reduced since the relatively small amount of wheel slip that will result from cornering is less likely to cause a loss of traction than is the spinning of one of the wheels due to a loss of grip. Specifically referring to FIG. 12, the differential control includes a turning factor which starts to decrease the locking torque when the steering angle increases above 120° and reduces the locking torque to zero when the steering angle reaches 200°. This is to prevent the differentials from inhibiting cornering. In the mud/ruts driving mode the reduction in locking torque in response to turning is reduced because maintaining traction takes a higher priority than accurate steering under those conditions. The D.S.C. system is de-sensitized as shown by curve B in FIG. 11. The hill descent control is switched on with the standard default target speed of 6 kph to provide maximum control on hills, the suspension ride height is set to the high setting so as to increase ground clearance, which is desirable in deep mud and ruts, and the suspension cross linking is set to the maximum setting to maximize traction.

In the sand driving mode, the subsystem configuration modes are set up for driving on sand, and in particular to provide the best traction on sand. The throttle characteristic is as shown by curve C in FIG. 7, and is arranged to be relatively gentle at low degrees of throttle pedal depression so as to reduce the chances of wheel spin at low speeds. Therefore at low degrees of pedal depression the torque produced is lower, for any given pedal position, than in the standard mode. However at high degrees of throttle pedal progression the drive torque demand increase more rapidly with throttle pedal depression so as to produce more power more quickly than in the standard mode. Therefore at high degrees of throttle pedal depression the torque produced for any given pedal position is higher than in the standard mode. Similarly the transmission control operates in the sand mode described above in the first embodiment. The differential control is the same as in the mud/ruts mode, again having a low sensitivity to steering angle for the same reason. The traction control system is set up to allow higher levels of wheel spin than in the standard mode as shown by curve C in FIG. 10. As an alternative to this the traction control may use a special sand mode configuration as described above for the first embodiment in which wheel spin is kept very low at low vehicle speeds, but is allowed to increase to relatively high levels at higher vehicle speeds. The engine intervention is switched off to prevent undesirable reductions in drive torque. The D.S.C. system is set to a low sensitivity as shown by curve C in FIG. 11, brake steer torque being introduced only at high levels of yaw rate error and increasing slowly with increasing yaw rate error. As an alternative the D.S.C. system can be turned off altogether in sand mode. The hill descent control is switched off because sand generally provides a high degree of drag and the vehicle either needs to be driven positively down a hill rather than braked, or, if braking is required, engine braking is generally sufficient. The suspension ride height is set to standard height and the suspension cross linking is set to minimum.

In the rock crawl driving mode the throttle characteristic is set, as in grass/gravel/snow and mud/ruts driving modes, to follow curve B in FIG. 7, i.e. to be relatively insensitive to changes in throttle pedal position over the range of positions usually used. Gearbox control is also set up as for grass/gravel/snow and mud/ruts driving modes. The differentials are set up to follow curve B in FIG. 8, i.e. to have a higher starting locking torque than in grass/gravel/snow and mud/ruts driving modes, and to increase the locking torque more rapidly in response to differences in wheel speeds between the vehicles wheels, as measured by slip across the differentials. The response of the differential control to suspension articulation is also increased as shown by curve B in FIG. 9, with the rate of change of locking torque with increasing articulation being higher than in the standard mode. The traction control and D.S.C. are set up as in the mud/ruts mode, the traction control following curve B in FIG. 10 to provide an increased sensitivity to wheel spin, and the D.S.C. following curve B in FIG. 11 to provide a decreased sensitivity to yaw rate error. The hill descent control is switched on with a low default target speed of, for example 3 kph, the suspension ride height is set to high to give best ground clearance and the suspension cross linking is set to maximum to allow maximum suspension articulation.

As an alternative, an improved rock crawl driving mode may be included in which the subsystem configuration modes are selected to achieve and maintain the requested vehicle speed. The engine controller 28 in the form of an engine management system controls operation of the engine 18 so as to control its speed and output power and torque in response to driver inputs. The driver inputs may be in the form of the traditional cruise control switches, or preferably via the accelerator pedal. The engine controller 28 will operate as a torque controller and will determine the error between actual road speed and the requested road speed demanded by the driver. This error will then be managed by the engine controller 28. One alternative for managing the error would consist of a proportional, integral and differential term strategy. The engine controller 28 will be optimized to enable the requested road speed to be achieved and maintained, using up to maximum available torque while providing comfort and predictability to the driver. As shown in FIG. 7, the accelerator pedal will allow large throttle movement resulting in small requested changes in road speed. This will help to alleviate the movement of the driver's foot caused by the sometimes-violent movement of the vehicle over rough terrain. As the accelerator pedal moves toward full travel, it may transfer from a vehicle speed controller to a torque controller, to enable the driver to accelerate at a higher rate. AT zero pedal position, the road speed request will be zero to provide maximum engine braking and idle.

The improved rock crawl mode may also include an improved Hill Descent control system. In the event in which the brakes are used to control road speed where maximum engine braking has been reached but the road speed is still higher than the requested driver input speed, the hill descent control would control to a specific road speed or zero road speed if the throttle were closed.

Finally, a dynamic driving mode is included which is intended for more sporty driving. In this mode the throttle pedal characteristic follows curve D in FIG. 7, being arranged to produce the most engine torque for any given throttle pedal position, and the most rapid increase in engine torque in response to throttle pedal depression, over the lower range of throttle pedal depressions. The gearbox control is also arranged to keep the gearbox in lower gear then in the standard mode, with the changes up being delayed when the vehicle is accelerating and changes down being made early when the vehicle is slowing, so as to give the best acceleration and the most engine braking on deceleration. The traction control and D.S.C and differentials are set to the same settings as in standard driving mode, the suspension is set to its lowest ride height, and the hill descent control is turned off.

Figure 13:
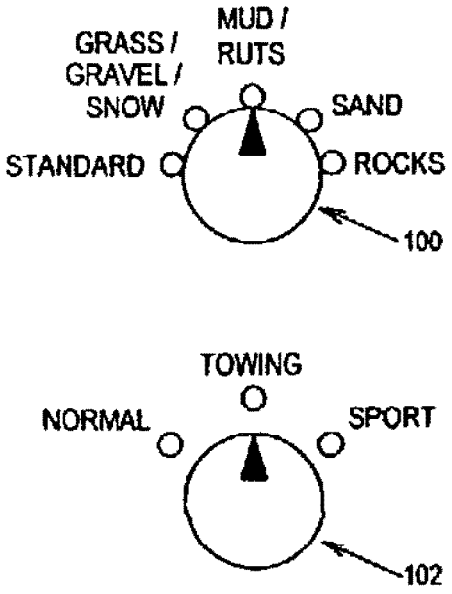
FIG. 13 shows user inputs forming part of a third embodiment of the invention.

Referring to FIG. 13, in a third embodiment of the invention the driving mode in which the vehicle operates is determined by two separate inputs. One input, a rotary terrain knob 100, allows the user to input the type of terrain over which the vehicle is being driven. The other input, a rotary "mode of use" knob 102 allows the user to input the mode in which the vehicle is to be used. This can include vehicle modes relating to the manner in which the vehicle is to respond to the driver's inputs, such as a sport mode or an economy mode, as well as modes relating to the state of the vehicle, such as a towing mode suitable for towing a trailer, and a laden mode for when the vehicle is carrying a particularly heavy load. In this example the vehicle "mode of use" knob allows selection of normal, sport, and towing vehicle driving modes. The sport driving mode is adapted for use when the vehicle is being driven in a "sporty" manner, characterized for example by one or more of: rapid acceleration and braking, high cornering speeds, high engine speeds and relatively low gears for any given vehicle speed.

The terrain selection input allows the selection of standard, grass/gravel/snow, mud/ruts, sand, and rocks driving modes as in the second embodiment. When the "mode of use" input is set to normal the operating modes of the vehicle correspond to the driving modes in the second embodiment. If the mode-of-use input is turned to towing mode, then each of the terrain modes selected is modified to make the vehicle more effective at towing. For example, the suspension ride height is locked, or changes in height restricted, so as to avoid tilting the trailer, and the throttle map and gear change map are modified so as to provide a high level of torque when pulling away from rest. When the sport mode-of-use is selected, the subsystem configuration modes are controlled so as to provide a sporty driving feel: the suspension is lowered, the throttle map and gear change maps are modified to provide rapid acceleration and high levels of engine braking.

In some terrains, one or more of the mode-of-use selections may be inappropriate and selection of those modes-of-use may not result in modification of the vehicle control when those terrains are selected. For example the sport mode-of-use may not be selectable, or may have no effect on the vehicle, of selected in combination with rock crawl, mud/ruts or grass/gravel/snow. Towing is, however, selectable with all terrain selections.

Figure 14:
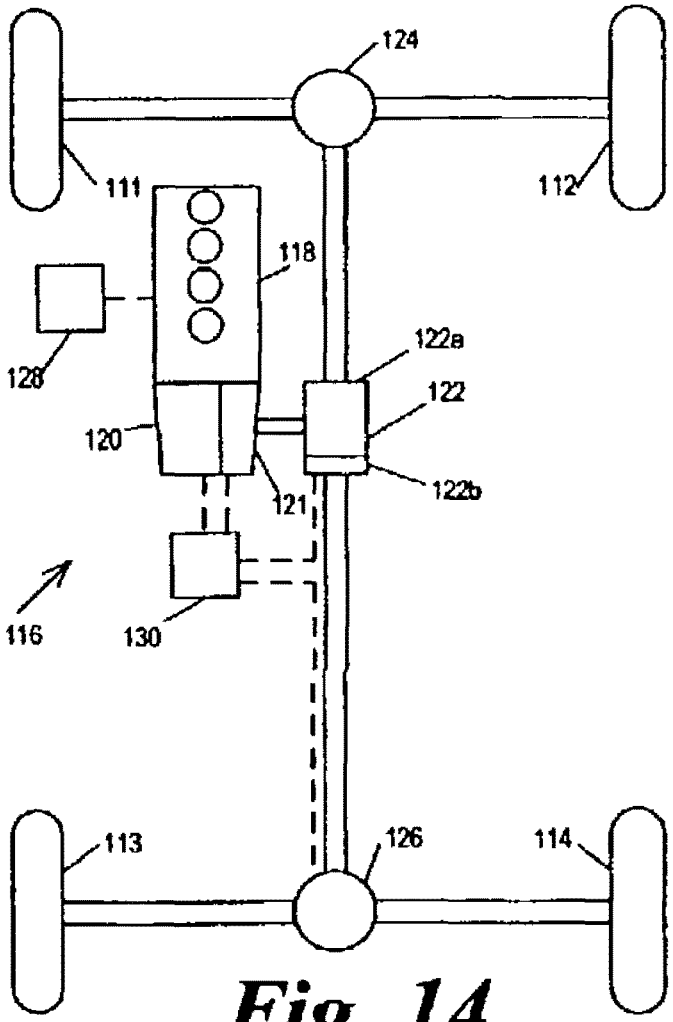
FIG. 14 is a diagrammatic representation of a powertrain subsystem of a vehicle according to a fourth embodiment of the invention.

Referring to FIG. 14 a vehicle according to a fourth embodiment of the invention has a powertrain similar to that of the first embodiment and shown in FIG. 1, and corresponding parts are indicated by the same reference numeral increased by 100. The difference between this embodiment and the first is that the center differential is replaced by a power take off system 122 which includes a direct coupling 122a between the transfer box 121 and the front differential 124, and a clutch mechanism 122b which can be controlled by the powertrain controller 130 to redirect drive torque to the rear differential 126 and hence to the rear wheels 113 114. Under normal driving conditions the clutch mechanism 122b allows substantially all of the driving torque to be transmitted directly to the front wheels via the front differential 124. However, if the front wheels start to slip, as detected for example by wheel speed sensors, then the clutch mechanism 122b is operated to direct drive torque to the rear wheels 113, 114 via the rear differential 126. The proportion of the drive torque which is re-directed to the rear differential 126 is controlled so as to reduce the amount of slip at the front wheels to an acceptable level. The clutch 122b is set to a pre-load which is variable, and the clutch load is then increased in response to detected slip of the front wheels 111, 112. In situations where good traction is required, a high pre-load and high sensitivity to slip are desirable. For good dynamic performance a low re-load is desirable and sensitivity to slip is less important. For on-road driving, low pre-load and sensitivity are provided, and for off-road driving a higher pre-load and higher sensitivity are provided. If a sand mode is provided the degree of slip is set to be low at low speeds and higher at higher speeds in a similar manner to the traction control system.

Figure 15:
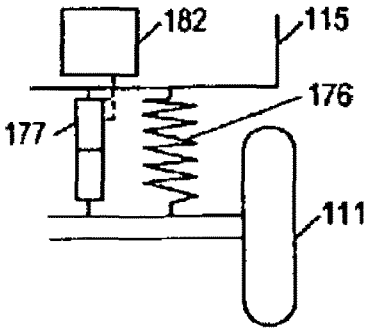
FIG. 15 is a diagrammatic representation of part of a suspension subsystem of the vehicle according to the fourth embodiment of the invention.

Referring to FIG. 15, the fourth embodiment also includes, as well as springs 176 in its suspension system, dampers 177 arranged to damp vertical movement of the wheels 111 relative to the vehicle's body 115. The dampers 177, only one of which is shown, are electrically controlled, having a variable damping rate, which is variable between a high level, where relatively high resistance is provided to vertical wheel travel, and a lower rate at which less resistance is provided. The damping of each of the dampers 177 is controlled by the suspension controller 182. The damping can be controlled in response to a number of parameters such as vehicle speed and steering angle to improve ride and handling. The amount of damping is also varied depending on which mode is selected. In on-road modes a high degree of damping is generally provided to give good handling, and in off-road modes lower damping is provided to give good traction.

In this fourth embodiment, the vehicle mode controller 98 uses information passed on from the various subsystem controllers relating to the nature of the surface over which the vehicle is traveling, the manner in which the vehicle is being driven, and the way in which the vehicle is being used, to select an appropriate mode automatically. For example, the wheel speed sensors and ride height sensor are used to classify the nature of the surface as on-road or off-road, high friction or low friction, etc. The powertrain controller 130 and steering angle sensor 49 are used to classify the driving style as normal or sporty. It is also possible to determine from the various sensors whether the vehicle is heavily laden.

The automatic mode selection can either be the sole means of selecting modes, giving the driver no input to the mode selection process. Alternatively it may be advisory, with the driving having the option to override the automatic selection of mode. In a further alternative the driver may have the primary control over the selection of the driving mode, with the vehicle mode controller 98 over-riding the driver's selection if the driving conditions or driving style of the driver make the driver's selection unsafe.

It will be appreciated that the number of available modes can be varied depending on the requirements for a particular vehicle. For example in the simplest case, it might be that only two modes were required, which might be the standard mode which would be suitable for "on-road" driving and the rock crawl mode which would be suitable for "off-road driving". Alternatively, there could be one on-road mode and two off-road modes, for example the rock crawl mode and the grass/gravel/snow mode.

Having thus described the invention of the present application in detail and by reference to preferred embodiments thereof, it will be apparent that modifications and variations are possible without departing from the scope of the invention defined in the appended claims.

What is claimed:

[1. A vehicle control system having a driver input for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface.]

[2. A vehicle control system according to claim 1, wherein the driving modes comprise a plurality of different driving modes suitable for different conditions of the vehicle.]

[3. A vehicle control system according to claim 1 wherein the driving modes include an off-road mode in which the subsystem configurations are controlled in a manner suitable for driving on rough terrain and an on-road mode in which the subsystem configurations are controlled in a manner suitable for driving on-road.]

[4. A vehicle control system according to claim 1 wherein the driving modes include at least one low friction mode in which the subsystem configurations are controlled in a manner suitable for driving on low friction surfaces and a high friction mode in which the subsystem configurations are controlled in a manner suitable for driving on high friction surfaces.]

[5. A vehicle control system according to claim 4 wherein the low friction mode is arranged to be suitable for driving on grass, gravel and snow.]

[6. A vehicle control system according to claim 1 wherein the driving modes are selectable by a driver of the vehicle.]

[7. A vehicle control system according to claim 6 wherein the driving modes are selectable by means of two inputs, one of which is a terrain selection input arranged to influence the configuration mode selected on the basis of the terrain selected, and the other which is a mode of use input arranged to influence the configuration mode selected on the basis of a selected mode of use of the vehicle.]

[8. A vehicle control system according to claim 6 wherein the mode of use input is arranged to allow selection between a plurality of driving styles.]

[9. A vehicle control system according to claim 8 wherein the driving style includes a sport style.]

[10. A vehicle control system according to claim 1 further comprising sensing means arranged to sense at least one parameter wherein the control system is arranged to select said driving modes on the basis of said parameter.]

[11. A vehicle control system according to claim 10 wherein the parameter varies with the manner in which the vehicle is being used.]

[12. A vehicle control system according to any one of claims 1-11 in which the vehicle control system is further included in a motor vehicle.]

[13. A vehicle control system according to claim 1 further comprising a driver input for selecting a mode of use.]

14. A method of controlling a plurality of subsystems within a motor vehicle in a manner suitable for a respective driving surface, the subsystems each being operable in a plurality of subsystem configuration modes, the method comprising the steps of:

connecting a vehicle mode controller to the vehicle subsystems, the vehicle mode controller having a plurality of driving modes and a driver input for selecting a driving surface;

storing a set of control commands from the plurality of driving modes in a memory of the vehicle mode controller in response to the driver input of a driving surface;

transmitting the set of stored control commands to each of the plurality of vehicle subsystems; and selecting of a set of subsystem control parameters by each of the plurality of vehicle subsystems so as to provide the appropriate operation of each of the vehicle subsystems.

15. The method claimed in claim 14, wherein at least one of the driving modes is a rock crawl mode.

16. A method of controlling a plurality of subsystems within a motor vehicle in a manner suitable for a respective driving surface, the subsystems each being operable in a plurality of subsystem configuration modes, the method comprising the steps of:

connecting a vehicle mode controller to the vehicle subsystems, the vehicle mode controller having a plurality of driving modes, a driver input for selecting a driving surface, and a plurality of subsystem sensor information;

storing a set of control commands from the plurality of driving modes in a memory of the vehicle mode controller in response to the plurality of subsystem sensor information and the driver input of the driving surface;

transmitting the set of stored control commands to each of the plurality of vehicle subsystems; and selecting of a set of subsystem control parameters by each of the plurality of vehicle subsystems so as to provide the appropriate operation of each of the vehicle subsystems.

17. A computer program product comprising a medium on which or in which, when executed in a computer system, will perform the method as in any one of claims 14-16.

[18. A vehicle control system having a driver input for selecting a surface terrain, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective surface terrain.]

[19. A vehicle control system according to claim 18, wherein one of the plurality of vehicle subsystems is a suspension subsystem.]

[20. A vehicle control system according to claim 19, wherein the plurality of vehicle subsystems further comprise a steering subsystem, a brake subsystem, an engine management subsystem, and a transmission subsystem.]

*21. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, and further wherein the plurality of driving modes includes at least two off-road modes in which the subsystem configurations are controlled in a manner suitable for driving on respective off-road driving surfaces, and an on-road mode in which the subsystem configurations are controlled in a manner suitable for driving on-road, and still further wherein one of the off-road modes is a sand mode in which the vehicle subsystems are controlled in a manner suitable for driving on sand.*

*22. A vehicle control system as claimed in claim 21, wherein one of the subsystems comprises a powertrain system which includes a throttle pedal, the subsystem configuration modes providing different levels of responsiveness of the powertrain system to movement of the throttle pedal; and*

*wherein, in the sand mode, responsiveness to movement of the throttle pedal is lower at relatively low vehicle speeds than it is at higher vehicle speeds.*

*23. A vehicle control system as claimed in claim 21, wherein at least one of the subsystems is arranged, in the sand mode, to allow lower levels of wheel spin when the vehicle is travelling at lower speeds than when the vehicle is travelling at higher speeds.*

*24. A vehicle control system as claimed in claim 21, wherein one of the vehicle subsystems is a brake subsystem and wherein, in the sand mode, the brake subsystem is arranged to allow a relatively high degree of wheel slip under braking relative to the on-road mode and/or a second off-road mode.*

*25. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, and further wherein the plurality of driving modes includes at least two off-road modes in which the subsystem configurations are controlled in a manner suitable for driving on respective off-road driving surfaces, and an on-road mode in which the subsystem configurations are controlled in a manner suitable for driving on-road, and still further wherein a first off-road mode is a low friction mode in which the subsystem configurations are controlled in a manner suitable for driving on low friction surfaces and the first off-road mode is arranged to be suitable for driving on gravel.*

*26. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, and further wherein the plurality of driving modes includes at least two off-road modes in which the subsystem configurations are controlled in a manner suitable for driving on respective off-road driving surfaces, and an on-road mode in which the subsystem configurations are controlled in a manner suitable for driving on-road, and still further wherein a first off-road mode is a low friction mode in which the subsystem configurations are controlled in a manner suitable for driving on low friction surfaces and the first off-road mode is arranged to be suitable for driving on snow and grass.*

*27. A vehicle control system as claimed in claim 25 or claim 26, wherein a second off-road mode is a low friction mode in which the subsystem configurations are controlled in a manner suitable for driving on low friction surfaces, wherein the second off-road mode is arranged to be suitable for driving on mud.*

*28. A vehicle control system as claimed in claim 27, wherein a third off-road mode is a sand mode in which the subsystems are controlled in a manner suitable for driving on sand.*

*29. A vehicle control system as claimed in claim 28, wherein a fourth off-road mode is a rock crawl mode in which the subsystems are controlled in a manner suitable for driving over rocks.*

*30. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, and further wherein the plurality of driving modes includes at least two off-road modes in which the subsystem configurations are controlled in a manner suitable for driving on respective off-road driving surfaces, and an on-road mode in which the subsystem configurations are controlled in a manner suitable for driving on-road, and still further, wherein the driver input device comprises a selector for selecting the plurality of driving modes in the order of the on-road driving mode, a first off-road mode and a second off-road mode.*

*31. A vehicle control system as claimed in claim 30, wherein the first off-road mode is arranged to be suitable for driving on grass and/or gravel and/or snow, and the second off-road mode is one of a mud mode, a sand mode and/or a rock crawl mode.*

*32. A vehicle control system as claimed in claim 30 or claim 31, wherein the selector is operable to permit selection of the plurality of driving modes in the reverse order.*

*33. A vehicle control system as claimed in claim 30, wherein the subsystem configuration modes are arranged such that the vehicle adopts a higher ride height in dependence on selection of the second off-road mode than for the first off-road mode.*

*34. A vehicle control system as claimed in claim 33, wherein the subsystem configuration modes are arranged such that the vehicle adopts a higher ride height in dependence on selection of the first off-road mode than for the on-road mode.*

*35. A vehicle control system as claimed in claim 30, wherein one of the subsystems comprises a differential system operable to provide a plurality of levels of differential lock, wherein the subsystem configuration modes are arranged such that the level of differential lock is higher in dependence on the selection of the second off-road mode than for the first off-road mode.*

*36. A vehicle control system as claimed in claim 35, wherein the subsystem configuration modes are arranged such that the level of differential lock is higher in dependence on the selection of the first off-road mode than for the on-road mode.*

*37. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, and further wherein the plurality of driving modes includes at least two off-road modes in which the subsystem configurations are controlled in a manner suitable for driving on respective off-road driving surfaces, and an on-road mode in which the subsystem configurations are controlled in a manner suitable for driving on-road, and still further, wherein one of the subsystems comprises a powertrain system which includes a throttle pedal, the subsystem configuration modes providing different levels of responsiveness of the powertrain system to movement of the throttle pedal.*

*38. A vehicle control system as claimed in claim 37, wherein, in a first off-road mode, a throttle pedal characteristic is arranged such that torque increases relatively rapidly at low degrees of pedal displacement and increases relatively slowly at higher degrees of pedal displacement and wherein, in a second off-road mode, a throttle pedal characteristic is arranged such that torque increases relatively slowly at low degrees of pedal displacement and increases relatively rapidly at higher degrees of pedal displacement.*

*39. A vehicle control system as claimed in claim 37, wherein in at least one of the off-road modes the powertrain system is arranged to provide lower levels of drive torque, for a given throttle pedal position, at least at low levels of throttle pedal depression, than in the on-road mode.*

*40. A vehicle control system as claimed in claim 37, wherein the powertrain system is arranged to provide relatively low levels of drive torque for a given throttle pedal position at low vehicle speeds and to provide relatively high levels of drive torque for a given throttle pedal position at higher vehicle speeds.*

*41. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, and further wherein the plurality of driving modes includes at least two off-road modes in which the subsystem configurations are controlled in a manner suitable for driving on respective off-road driving surfaces, and an on-road mode in which the subsystem configurations are controlled in a manner suitable for driving on-road, and still further wherein one of the subsystems is a suspension subsystem and, in a second*

*off-road mode, the suspension system is arranged to provide a higher ride height than in a first off-road mode.*

*42. A vehicle control system as claimed in claim 41, wherein, in the first off-road mode, the suspension system is arranged to provide a higher ride height than in the on-road mode.*

*43. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, and further wherein the plurality of driving modes includes at least two off-road modes in which the subsystem configurations are controlled in a manner suitable for driving on respective off-road driving surfaces, and an on-road mode in which the subsystem configurations are controlled in a manner suitable for driving on-road, and still further wherein one of the subsystems comprises a brake system which can provide an anti-lock function to control wheel slip, and said plurality of subsystem configuration modes allow different levels of said wheel slip.*

*44. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, and further wherein the plurality of driving modes includes at least two off-road modes in which the subsystem configurations are controlled in a manner suitable for driving on respective off-road driving surfaces, and an on-road mode in which the subsystem configurations are controlled in a manner suitable for driving on-road, and still further wherein one of the subsystems comprises a traction control system which is arranged to control wheel spin, and said plurality of subsystem configuration modes allow different levels of said wheel spin, and the traction control system is arranged to allow less wheel spin in at least one of the off-road modes than in the on-road mode.*

*45. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, and further wherein the plurality of driving modes includes at least two off-road modes in which the subsystem configurations are controlled in a manner suitable for driving on respective off-road driving surfaces, and an on-road mode in which the subsystem configurations are controlled in a manner suitable for driving on-road, and still further wherein one of the subsystems comprises a transmission system operable in a plurality of transmission ratios and arranged to monitor at least one parameter of the vehicle and to select the transmission ratios in response, and wherein the subsystem modes include a plurality of transmission configuration modes in which the transmission ratios are selected differently in response to said at least one parameter.*

*46. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, and further wherein the plurality of driving modes includes at least two off-road modes in which the subsystem configurations are controlled in a manner suitable for driving on respective off-road driving surfaces, and an on-road mode in which the subsystem configurations are controlled in a manner suitable for driving on-road, and still further wherein one of the subsystems is a speed control system arranged to control the speed of the vehicle when descending a hill, and wherein the speed control system is arranged to be switched on in at least one of the off-road modes and switched off in the on-road mode.*

*47. A vehicle comprising a system as claimed in any one of claims 21, 22 to 24, 25 to 36, 37 to 40, 41, 42, 43, 44, 45, 46, 56 to 60, and 61.*

*48. A method as claimed in claim 14, wherein the driving modes include at least two off-road modes in which the subsystem configurations are controlled in a manner suitable for driving on respective off-road driving surfaces, and an on-road mode in which the subsystem configurations are controlled in a manner suitable for driving on-road.*

*49. A method as claimed in claim 48, wherein said plurality of vehicle subsystems comprises one or more of an engine management system, a transmission system, a steering system, a brake system and a suspension system.*

*50. A method as claimed in claim 48, wherein one of the off-road modes is a sand mode in which the subsystems are controlled in a manner suitable for driving on sand.*

*51. A method as claimed in claim 48, wherein one of the vehicle subsystems is a brake subsystem and wherein one of the off-road modes is a plough surface mode in which the subsystem control parameters are selected such that a relatively high degree of wheel slip under braking is allowed relative to the on-road mode and/or a second off-road mode.*

*52. A method as claimed in claim 48, wherein a first off-road mode is a low friction mode in which the subsystem configurations are controlled in a manner suitable for driving on low friction surfaces, wherein the first off-road mode is arranged to be suitable for driving on grass, gravel and/or snow.*

*53. A method as claimed in claim 52, wherein a second off-road mode is a low friction mode in which the subsystem configurations are controlled in a manner suitable for driving on low friction surfaces, wherein the second off-road mode is arranged to be suitable for driving on mud.*

*54. A method as claimed in claim 48, wherein one of the off-road modes is a rock crawl mode in which the subsystems are controlled in a manner suitable for driving over rocks.*

*55. A method as claimed in claim 14, wherein one of the subsystems comprises a powertrain system which includes a throttle pedal, the subsystem configuration modes providing different levels of responsiveness of the powertrain system to movement of the throttle pedal; and wherein, in a first off-road mode, a throttle pedal characteristic is arranged such that torque increases relatively rapidly at low degrees of pedal displacement and increases relatively slowly at higher degrees of pedal displacement and wherein, in a second off-road mode, a throttle pedal characteristic is arranged such that torque increases relatively slowly at low degrees of pedal displacement and increases relatively rapidly at higher degrees of pedal displacement.*

*56. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, wherein the vehicle control system is operable to store a set of control commands for the plurality of driving modes in a memory, and wherein the system is operable to transmit at least one of the stored control commands to the plurality of vehicle subsystems in response to a selection of a driving surface via the driver input device.*

*57. A vehicle control system according to claim 56 wherein the system includes a plurality of subsystem sensors.*

*58. A vehicle control system according to claim 57 wherein the system is operable to transmit at least one of the stored control commands to the plurality of vehicle subsystems in response to both a selection of a driving surface via the driver input device and sensor information from the plurality of subsystem sensors.*

*59. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, wherein the system comprises a plurality of subsystem sensors and wherein the system is operable in an automatic selection mode in which one of the plurality of driving modes is selected automatically in dependence on subsystem sensor information.*

*60. A vehicle control system according to claim 59, wherein the plurality of subsystem sensors comprise one or more of a wheel speed sensor, a ride height sensor and a steering angle sensor.*

*61. A vehicle control system having a driver input device for selecting a driving surface, the vehicle control system arranged to control a plurality of vehicle subsystems each of which is operable in a plurality of subsystem configuration modes, wherein the vehicle control system is operable in a plurality of driving modes in each of which it is arranged to select the subsystem configuration modes in a manner suitable for a respective driving surface, wherein the system comprises a plurality of subsystem sensors and wherein the system is operable to determine an appropriate driving mode from the plurality of driving modes for the current driving conditions and to output advice to the driver relating to the determined driving mode.*

* * * * *